UNITED STATES PATENT OFFICE 2,430,001

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 2, 1945,
Serial No. 586,267

5 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification, as contemplated in the present application, includes the preventive step of commingling the demulsifier with the aqueous component, which would or might subsequently become either phase of the emulsion, in absence of such precautionary measure. Similarly, such demulsifier may be mixed with the hydrocarbon component.

The new material or composition of matter herein described, consists of a hydrophile acylated pyridinium compound of the formula:

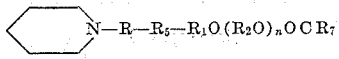

in which $R_5$ is a member of the class consisting of methylene and substituted methylene radicals representing the residue of low molal aldehydes; R is the radical obtained by the removal of an alpha-hydrogen atom from the acid radical of a low molal carboxy acid ester of a phenoxyalkanol of the formula:

$$R_1O(R_2O)_nH$$

in which $R_1$ is a substituted monocyclic phenol radical having 2 of the 3 reactive 2, 4, 6 positions substituted by 2 alkyl side chains, of which at least one contains 3 carbon atoms, and the longest of which does not contain more than 8 carbon atoms; $R_2O$ is an alkylene oxide radical containing at least 2 and not more than 4 carbon atoms and selected from the class consisting of ethylene oxide, propylene oxide, butylene oxide, glycide and methylglycide radicals; and $n$ is a small whole number varying from 1 to 3, or even 4 or 5, or more, for instance, 6; $R_7CO$ is the acyl radical of a detergent-forming monocarboxy acid having at least 8 and not more than 32 carbon atoms. In any event, the value of $n$ must be such as to insure at least incipient hydrophile properties in the final product.

More specifically, then, R in the first formula of the text represents the divalent radical by elimination of a nuclear hydrogen atom and a halogen from the ester of the formula:

 Halogen in which all of the symbols have their prior significance and $OCR_3$ Halogen is the acyl radical of a low molal alphachloromonocarboxy acid, such as chloroacetic acid. In other words, repeating the previous example with specific reference to chloroacetic acid, the formula becomes:

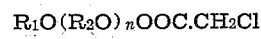

The herein contemplated procedure involves steps which convert a water-insoluble chemical compound into a hydrophile or water-miscible compound by conversion into a pyridinium salt. In some instances, it may be necessary to use enough oxyalkylating agent that $n$ may be as much as 6 or 8, instead of being limited to 3, in order to insure water solubility. Furthermore, it will be subsequently shown that one may conveniently react a diol of the kind contemplated as a reactant, with one mole of the detergent-forming monocarboxy acid, such as oleic acid, ricinoleic acid, naphthenic acid, or the like, and then subsequently oxyalkylate again prior to esterification, with chloroacetic acid.

Briefly stated, the preparation of our new material or composition of matter contemplates five steps: The first step consists in reacting 2 moles of a properly selected substituted phenol with one mole of an aldehyde, so as to produce a diphenylolmethane or substituted methane. The preferred aldehyde is formaldehyde, on account of its reactivity and low cost. Other aldehydes which may be used are acetaldehyde, propionaldehyde, butyraldehyde, and furfural. The condensation reactions of this type are well known and do not require description. In the case of furfural, it is desirable to use alkaline condensing agents, but in the other instances, acid or acidic substances are usually employed. Since these condensation reactions cannot produce resins in the usual sense, they are comparatively simple and result in oils varying from moderately viscous substances to oils so viscous as to appear to be almost solid.

The phenols are selected so that resinification does not take place, insofar that the phenols are limited to types in which there is only one reactive nuclear hydrogen atom. Specifically, then, the phenols may be indicated by the following formula:

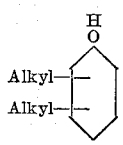

with the proviso that the two alkyl groups occupy 2 of the 2, 4, 6 positions, and that at least one of the alkyl side chains contains three carbon atoms, and the longest alkyl side chain does not contain more than 8 carbon atoms. When 2 moles of such phenol are condensed in the customary manner with a reactive aldehyde, one obtains a substituted diphenylol methane or substituted methane of the following formula:

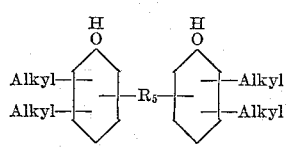

in which $R_5$ is a methylene radical, or a substituted methylene radical which represents the residue of an aldehyde and is preferably the unsubstituted methylene radical derived from formaldehyde.

As to various suitable phenols, we prefer to use 2-4-diamyl phenol or p-tert-butyl-o-cresol. Other suitable phenols include

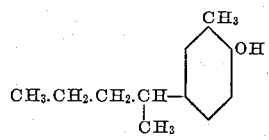

(1-methyl-butyl)-ortho-cresol

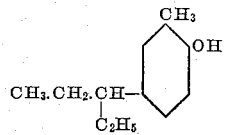

(1-ethyl-propyl)-ortho-cresol

See U. S. Patent No. 2,073,995, dated March 16, 1937, to Raiziss et al. See also U. S. Patent No. 2,106,760, dated February 1, 1938, to Raiziss et al.

Other phenols can be prepared by the alkylation of ortho- or paracresol by the same procedure as is employed for the alkylation of phenol. See U. S. Patent No. 2,060,573, dated November 10, 1936, to Hester.

We have found that 2,4-dipropylphenol is also an excellent raw material. See also U. S. Patents Nos. 2,064,885, dated December 22, 1936 to Carpenter; 2,104,412, dated January 4, 1938, to Buc, and 2,207,753, to Moyle et al., dated July 16, 1940.

It is understood that there is no objection to the presence of an additional alkyl radical, provided that its presence still leaves a reactive nuclear hydrogen atom. Such alkyl radical, if present, is limited to radicals having not over 8 carbon atoms and must occupy one of the 3 or 5 positions. For all practical purposes, however, such compounds are derived from metacresol or similar homologs, and thus, for the sake of brevity in the hereto appended claims, such alkyl groups will be indicated as being in either the 3 position, or in the 5 position. For the sake of convenience, however, it is understood that the 3 and 5 positions are the obvious equivalents. One such example would be the product obtained by the propylation of metacresol. The meta group does not occupy a reactive position, and its presence does not interfere with the subsequent reaction. In a few instances, compounds are obtainable where a cyclic radical may serve instead of an alkyl radical, for example, in 4-tert-butyl-2-phenylphenol or 4-tert-butyl-2-cyclo-hexylphenol.

Since the substituted phenols employed as reactants are invariably water-insoluble, and since formaldehyde, a water-soluble aldehyde, is the preferred reactant for introducing the methylene bridge, or its equivalent, we have found it most desirable to employ the procedure described in U. S. Patent No. 2,330,217, dated September 28, 1943, to Hunn. Briefly stated, this procedure includes the use of an acid catalyst along with an emulsifying agent to promote emulsification, and thus, reaction between the water-insoluble phenol and the water-soluble aldehyde. As an example of such procedure, the following is included:

PHENOL ALDEHYDE CONDENSATION

Example 1

| | Pounds |
|---|---|
| Diamyl (2,4) phenol | 702 |
| Formalin 40% U. S. P | 114 |
| Concentrated hydrochloric acid | 3.3 |
| Alkylated aryl sulfonic acid salt (Nacconal N. R. S. F.) | 3.3 |

The mixture is stirred vigorously under a reflux condenser at approximately 105° C. for approximately 2 hours. The temperature is then raised to approximately 150–160° C. and held at this temperature for about the same period of time. Afterwards, water is distilled over and eliminated. Part of the water may be conveniently distilled over while the reaction mass is being raised from the temperature of approximately 105° C. to 150° C., or thereabouts, or while it is being held at approximately 150° C.

PHENOL ALDEHYDE CONDENSATION

Example 2

The same procedure is employed as in the previous example, except that 618 pounds of dipropyl(2,4) phenol replaces the 702 pounds of diamylphenol used in the preceding example.

PHENOL ALDEHYDE CONDENSATION

Example 3

The same procedure is followed as in the two previous examples, except that one uses a mixture consisting of 351 pounds of diamyl(2,4)-phenol and 309 pounds of dipropyl(2,4)phenol. The result of such mixture is that the condensate is also a mixture, of which one-third corresponds to Example 1, preceding, one-third to Example 2, preceding, and the remaining third represents the type of compound in which the phenol nuclei are different, one being an amylated nucleus and the other a propylated nucleus.

Due to ready availability, and other desirable properties, it is particularly convenient and economical to replace dipropyl(2,4)phenol with an equivalent amount of 4,6-di-tertiary-butyl-m- cresol which is indicated by the following formula:

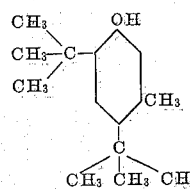

Instead of using the emulsification procedure, one may, of course, employ another well known method, to wit, the use of an alkaline catalyst in excess, particularly in amounts sufficient to dissolve or solubilize the water-insoluble phenol. Usually, a 10% sodium hydroxide solution is used to dissolve the substituted phenol. For complete details see, for example, Industrial & Engineering Chemistry, volume 24, No. 4, page 442; volume 29, No. 8, page 860; and No. 11, pages 1125 and 1305. Particular attention is directed to volume 29, No. 8, page 862. The author of all these articles is F. S. Granger.

In the second step a properly selected phenol of the kind typified by the formula:

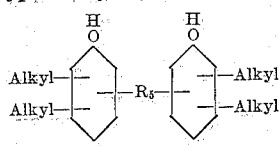

is treated with 2 to 12 moles of an oxyalkylating agent of the kind described, so as to produce a compound in which 2 phenoxyalkanols are united by a methylene bridge or substituted methylene bridge, as described.

If one employs 2 moles of ethylene oxide, the reaction may be indicated in the following manner:

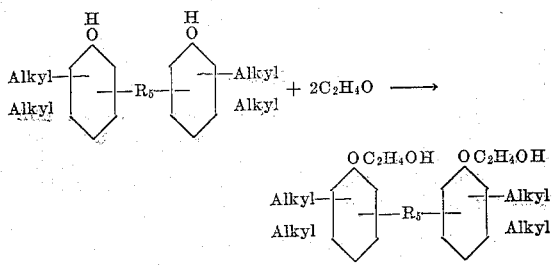

The third step and the fourth step of the method for producing our new material or compound, consists in esterifying a compound of the kind described with a reactant of the kind previously enumerated, such as monochloroacetic acid, and then with a high molal acid, such as a higher fatty acid. For reasons subsequently set forth, we prefer to conduct the reaction with the chloro substituted low molal monocarboxy acid first and then subsequently with the high molal monocarboxy acid. The reverse order may be followed, if desired, and particularly if the high molal acid is not a hydroxylated acid, such as ricinoleic acid, hydroxystearic acid, etc.

Thus, the third step consists in esterifying the diol thus obtained with a suitable alpha-chloromonocarboxy acid, such as acetic acid, to form the corresponding ester. This reaction may be illustrated in the following manner:

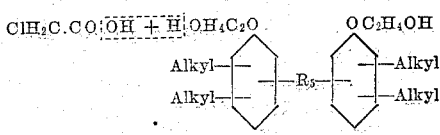

The fractional ester so obtained is then esterified with a high molal monocarboxy acid such as a higher fatty acid, and particularly an unsaturated higher fatty acid so as to give a complete ester, as indicated in the following manner:

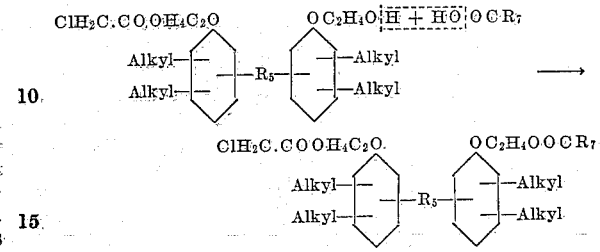

The final step consists in reacting the esters so obtained with pyridine, or its homologs, as subsequently specified. Such reaction may be indicated in the following manner:

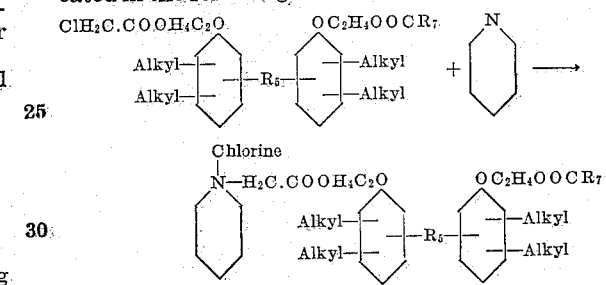

As suggested, one may not only use pyridine, but other homologs of pyridine, that is, members of the pyridine series. For instance, members of the pyridine series suitable as reactants include pyridine, alkylated derivatives of pyridine, particularly alkylated derivatives, in which the alkyl radical contains three carbon atoms, or less, and especially methylated pyridines, i. e., pyridines, in which one, two or three methyl groups have been substituted in the nucleus, such as picolines, lutidines and collidines. Also suitable as reactants are the comparable quinolines and isoquinolines, along with C-methyl homologs thereof. Coal tar bases represent mixtures of suitable heterocyclic materials which may be used as such, or after suitable purification, without separation into the individual components.

While chloroacetic acid or chloroacetyl chloride is the preferred halogen carboxylic acid compound, other halogen acids, halogen substituted acyl halides, and esterifying derivatives are suitable, particularly α-halogen carboxylic acids of not over six carbon atoms. When the halogen is in the α-position to the CO group, the reaction seems to go with greater readiness. With the shorter chain esterifying halogen carboxylic acids or their functional equivalents, especially chloroacetyl chloride, the reaction goes with great ease. Other halogen acylating compounds which are suitable are, for example, α-chloropropionic acid, etc., but especially any acid of the formula:

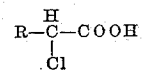

where R is a hydrogen atom or a methyl, ethyl or butyl radical.

Treatment of water-insoluble phenols with alkylene oxides of the kind enumerated, and particularly with ethylene oxide, propylene oxide and butylene oxide, is a well known procedure. Such compounds are frequently oxyethylated so as to render them water-soluble. In the present instance, instead of treating one mole of the selected phenol with a large ratio of oxyalkylating agent, one employs instead a comparatively low ratio, as indicated by the value for the letter $n$ in prior formulas. In other words, one treats the phenol with one mole, two moles or three moles of the oxyalkylating agent. The product so obtained is still distinctly water-insoluble, and this is also true of the ester derived therefrom. It is to be noted, however, that such water-insoluble product represents the initial oxyalkylation step in the same type of procedure employed to produce a water-soluble product. Thus, as an example of various patents which teach the oxyalkylation of water-insoluble phenols, including the stepwise addition of the oxyalkylating agent, attention is directed to the following: British Patent No. 470,181, British Patent No. 452,866, U. S. Patent No. 2,243,330, dated May 27, 1941, to De Groote & Keiser, and U. S. Patent No. 2,233,381, dated February 25, 1941, to De Groote & Keiser.

Having obtained the water-insoluble bis-(phenoxyalkanol)methane, such product is esterified with chloroacetyl chloride, chloroacetic acid, bromoacetic acid, alpha-chloropropionic acid, alpha-chlorobutyric acid, or the like. Such reaction, particularly between the acid itself, as differentiated from the acyl chloride, is simply an esterification reaction with the elimination of water and is preferably carried out in the presence of an inert solvent insoluble in water, which serves to remove the water of formation. Such procedure is illustrated by numerous patents, including the following: British Patent No. 500,765, U. S. Patent No. 1,732,392, dated October 22, 1929, to Wietzel, and U. S. Patent No. 2,264,759, dated December 2, 1941, to Jones.

Previous reference has been made to detergent-forming monocarboxy acids having 8 to 32 carbon atoms. Obviously, one can use not only the acids, but their equivalents, such as the anhydrides, acyl chlorides, esters, etc.

It is well known that certain monocarboxy acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R'COOH. Instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

Although any of the high molal monocarboxy acids can be employed, it is our preference to employ the higher fatty acids, rather than petroleum acids, rosin acids, and the like. We have found that by far the most effective demulsifying agents are obtained from unsaturated fatty acids having 18 carbon atoms. Such unsaturated fatty acids include the higher fatty acids, such as oleic acid, ricinoleic acid, linoleic acid, linolenic acid, etc. One may employ mixed fatty acids, as, for example, the fatty acids obtained by hydrolysis of cottonseed oil, soyabean oil, corn oil, etc. When our new product or compound is intended to be used as a demulsifier for resolving petroleum emulsions of the water-in-oil type, it is preferably obtained from fatty acids, and more specifically, unsaturated fatty acids.

Having obtained the completely esterified diol, it is only necessary to react such compound with pyridine or a pyridine homolog. This reaction takes place rapidly by refluxing in presence of an excess of pyridine, and subsequently removing the excess of pyridine which does not enter the reaction by distillation and preferably vacuum distillation. The herein described procedures are illustrated by the following examples:

Di(Hydroxyalkyloxyphenyl) Methane

*Example 1*

One pound mole of the product described under the heading "Phenol aldehyde condensation, Example 1" is treated with 2 pound moles of ethylene oxide in presence of ½ of 1% of sodium methylate; as the reaction proceeds the sodium methylate either dissolves or is converted into a soluble compound by chemical combination. Reaction is conducted at approximately 125° C. and 100–200 pound gauge pressure for approximately 2½ to 4 hours until the reaction appears to be complete, as indicated by the pressure dropping to zero. The product so obtained may be indicated by the following formula:

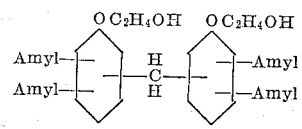

Di(Hydroxyalkyloxyphenyl) Methane

*Example 2*

The same procedure is employed as in the preceding example, except that 4 pound moles of ethylene oxide are employed instead of 2 pound moles and the period of reaction is approximately fifty percent longer.

Di(Hydroxyalkyloxyphenyl) Methane

*Example 3*

The same procedure is employed as in Example 1, preceding, except that 6 pound moles of ethylene oxide are employed instead of 2 pound moles and the time of reaction is approximately twice that indicated in Example 1.

Di(Hydroxyalkyloxyphenyl) Methane

*Example 4*

The same procedure is employed as in the three preceding examples, except that the propylated compound described under the heading "Phenol aldehyde condensation, Example 2" is substituted for the amylated derivative employed in the three preceding examples.

Di(Hydroxyalkyloxyphenyl) Methane

*Example 5*

The same procedure is employed as in Examples 1 to 4, preceding, except that propylene oxide is substituted for ethylene oxide.

Previous reference has been made to the fact that the esterification step is carried out in the conventional manner, preferably in the presence of an inert solvent. This simply means that the reactants, to wit, the acid, such as chloroacetic acid, and the phenoxyalkanol, are mixed in equimolar proportions in presence of a solvent, in which both are soluble, such as xylene, cymene, decalin, or the like. The mixture is refluxed at some suitable temperature, above 100° C. and below 200° C., so that water of formation resulting from the esterification reaction is carried over as a constant boiling mixture. Such mixed vapor is condensed in the customary manner so the water is trapped off, measured and then discarded and the solvent returned to the reaction vessel for further use. Ordinarily, such reactions are catalyzed by the addition of an acidic catalyst, such as toluene sulfonic acid, an alkyl phosphoric acid, dry hydrochloric acid, trichloroacetic acid, or the like. Insofar that the alpha-chlorocarboxy acids show marked acidity, in comparison with the unchlorinated carboxy acids, the reaction may be conducted without an added catalyst, if desired, or in the presence of an added catalyst, such as ½% to 1% of toluene sulfonic acid. Such catalyst tends to discolor the final product, but this is often immaterial, as for example, when the product is used as a demulsifier. The entire procedure is too well known to require further elaboration, but is illustrated by the following examples:

FRACTIONAL ESTER

Example 1

One pound mole of the compound described under the heading "Di(hydroxyalkyloxyphenol)-methane, Example 1," preceding, is mixed with 1 pound mole of chloroacetic acid and the mixture refluxed in presence of xylene equivalent to about 50% by volume of the reaction mass, with an appropriate trap for removal of 1 pound mole of water, at a temperature of approximately 155° to 225° C. The time required is usually 3 to 10 hours. The resultant is a dark colored, viscous liquid.

FRACTIONAL ESTER

Example 2

The same procedure is followed as in the preceding example, except that the di(hydroxyalkyloxyphenyl) methane, prepared as described under the headings of Examples 2, 3, 4, and 5, are substituted for the compound employed in immediately preceding Example 1.

FRACTIONAL ESTER

Example 3

The same procedure is employed as in the two preceding examples, except that a-chloropropionic acid is substituted for a-chloroacetic acid.

FRACTIONAL ESTER

Example 4

Chloroacetylchloride is substituted for chloroacetic acid. The reaction starts to take place rapidly between 45° C. and 80° C. and the temperature should be controlled so the reaction takes place at the lowest suitable temperature. The acylchloride should be added slowly to the di(hydroxyalkyloxyphenyl) methane with constant and vigorous stirring. Hydrochloric acid is formed and should be vented and disposed of in a suitable manner. If the reaction does not take place promptly, the temperature should be raised moderately, for instance, 5° to 15° C. or a bit higher, until the reaction proceeds smoothly. However, as soon as the reaction does start, the temperature should be lowered until the reaction proceeds at the slowest feasible rate. Generally, this means use of proper cooling devices or controlled slow addition of the acylchloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

If, however, fractional esters of the kind exemplified by the present examples are not intended for storage as an intermediate, then insofar that the next step, i. e., the conversion of a fractional ester into a complete ester with the introduction of a high molal acyl group, is still the same sort of reaction, there is no need to eliminate the catalyst or flush out the hydrochloric acid gas, if present. As a general rule, however, no catalyst is added, as chloroacetic acid is acidic enough to act as a catalyst itself. For this reason, our preference is to follow the procedure in the previous examples, and assuming that there is no hydrochloric acid present, to simply add a small amount of conventional catalyst, such as toluene sulfonic acid and alkyl phosphoric acid, or the like, to the extent of about one-half of 1%, or thereabouts, and proceed in substantially the same manner as in "Fractional ester, Example 1," preceding. Such procedure is illustrated by the following examples:

TOTAL ESTER

Example 1

One pound mole of the fractional ester described under the preceding heading marked "Fractional Ester, Example 1" is mixed with one pound mole of oleic acid and one-half of 1% of toluene sulfonic acid and an amount of xylene equivalent to approximately fifty percent by volume of the reaction mixture. Such mass is refluxed with an appropriate trap for the removal of one pound mole of water at a temperature of approximately 165° to 235° C. Time required is usually three to ten hours. The resultant mass is a dark, rather thick, viscous liquid.

TOTAL ESTER

Example 2

The same procedure is followed as in the preceding example, except that instead of using a fractional ester, exemplified by Example 1, one employs instead a fractional ester of the kind exemplified by the products described under the headings "Fractional ester, Example 2" or "Fractional ester, Example 3."

TOTAL ESTER

Example 3

Stearic acid is substituted for oleic acid, in Examples 1 and 2, preceding.

TOTAL ESTER

Example 4

Ricinoleic acid is substituted for oleic acid, in Examples 1 and 2, preceding.

TOTAL ESTER

Example 5

A naphthenic acid (or mixture of naphthenic acids) derived from California petroleum, is substituted for oleic acids in Examples 1 and 2, preceding.

The reaction has previously been indicated in the customary manner. This also applies to the step of reacting the diol with the chloro acid, to give the fractional ester. Reference is also made to the earlier reactions indicating the combination of the total ester with pyridine or pyridine homologs.

PYRIDINIUM HALIDE

Example 1

One pound mole of the total ester described in Example 1, preceding, is refluxed with constant stirring with several pound moles, for example, four to six, of technically pure pyridine. The reaction is conducted from approximately 1 hour to 20 hours, at a temperature in excess of 115° C., or thereabouts, until reaction is complete. Completeness of the reaction can be determined by distilling the uncombined pyridine from a sample and noting, by difference, the percentage of pyridine, which has been combined. Another suitable test is the determination of ionizable halogen, for instance, chlorine. It is to be noted that the reaction converts a non-ionizable halogen atom to an ionizable atom. When the reaction is complete, the excess of pyridine is removed by continuing the stirring and employing vacuum so as to give a substantially solid or highly viscous, dark colored mass. This reaction product should be completely soluble in water, whether hard or soft, and should be particularly effective as a surface tension depressant, even in very low concentrations.

Such compound conforms to the following formula:

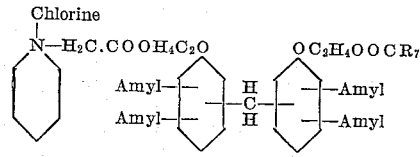

PYRIDINIUM HALIDE

Example 2

The same procedure is followed as in immediately preceding Example 1, except that a total ester, exemplified by Examples 2, 3, 4 or 5, preceding, is used instead of the total ester exemplified by Example 1, preceding.

PYRIDINIUM HALIDE

Example 3

The same procedure is followed as in the first two examples, but instead of using technically pure pyridine, one employs a commercial pyridine, in which there is present some monomethylpyridine and dimethylpyridine in addition to unsubstituted pyridine.

It is to be emphasized that all of the products herein contemplated are water-dispersible, or at least, produce a colloidal sol or show a distinct hydrophile property, after reaction with pyridine or pyridine homolog. The reactants, prior to such procedure, are not water-soluble. The compounds contemplated vary from fairly viscous liquids to semi-solids and solids. When produced in either glass or iron vessels, they invariably have a dark amber color.

In summary, then, the herein contemplated compound may be indicated by the following structural formula:

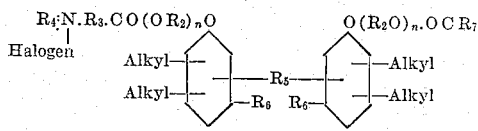

in which $R_2O$ is an alkylene oxide radical containing at least 2 and not more than 4 carbon atoms selected from the class consisting of ethylene oxide, propylene oxide, butylene oxide, glycide and methylglycide radicals; $n$ is a small whole number varying from 1 to 3; $OC.R_3$ is the acyl radical of a low molal monocarboxy acid having not more than 6 carbon atoms, in which an alpha-hydrogen atom has been removed; $N:R_4$ represents a radical of a heterocyclic compound of the pyridine series selected from the group consisting of pyridine, quinoline, isoquinoline, and C-linked methyl homologs; $R_5$ is a low molal aldehydic residue having not over 7 carbon atoms selected from the class consisting of methylene and substituted methylene radicals; $R_6$ is a member of the class consisting of hydrogen atoms and alkyl radicals having not over 8 atoms and with the additional proviso that the phenolic residues are substituted monocyclic phenol radicals having two of the three reactive 2, 4, 6 positions substituted by two alkyl side chains, of which at least one contains three carbon atoms and the longest of which does not contain more than 8 carbon atoms; and $(R_2O)_n.OCR_7$ is a radical in which $R_2O$ and $n$ have their prior significance, and $R_7CO$ is the acyl radical of a monocarboxy detergent-forming acid having at least 8 and not more than 32 carbon atoms.

The new materials or compositions herein described, form the subject-matter of our co-pending divisional application Serial No. 630,974, filed November 26, 1945.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like, to render the mud susceptible to reaction with hydrochloric acid or the like, and thus expedite its removal.

One preferred and more narrow aspect of our invention insofar as it is concerned with demulsification of petroleum emulsions of the water-in-oil type, is concerned with the admixture of the aminoester, as described, with a viscosity-reducing solvent such as the various solvents enumerated, particularly aromatic solvents, alcohols, ether alcohols, etc., as previously specified. The word "solvent" is used in this sense to refer to the mixture if more than one solvent is employed, and generally speaking, it is our preference to employ the demulsifier in a form representing 40% to 85% demulsifier and 15% to 60% solvent, largely, if not entirely, non-aqueous and so selected to give a solution or mixture particularly adaptable for proportional pumps or other measuring devices. The following examples will illustrate this aspect of our invention:

DEMULSIFIER

*Example 1*

| | Per cent |
|---|---|
| Pyridinium halide, Example 1 | 60 |
| Xylene | 30 |
| Tar acid oil | 10 |

DEMULSIFIER

*Example 2*

| | Per cent |
|---|---|
| Pyridinium halide, Example 2 | 65 |
| Commercial Cresol | 20 |
| Crude pyridine bases | 5 |
| Isopropyl alcohol | 10 |

DEMULSIFIER

*Example 3*

| | Per cent |
|---|---|
| Pyridinium halide, Example 7 | 55 |
| Decalin | 10 |
| Cymene | 10 |
| Dichloroethyl ether | 25 |

The above percentages are by weight.

In many instances, the materials obtained, rather than being characterized as a viscous, semi-solid, probably should be referred to as a tacky sub-resin or a tacky resin. The phenol aldehyde condensate, particularly when derived from formaldehyde, shows not only viscosity, but tackiness approaching or actually in the stringy state. This particular property is usually enhanced after conversion into a pyridinium compound. This enhancement applies usually to both the stringy character and the resinous character. Such change appears to be imparted by the fact that the large molecular structure still exists, but in addition, an ionic structure has been superimposed on the somewhat unusual molecular structure. This ionic structure naturally acts the same as such structure would act in an ordinary inorganic salt crystal. One result of such peculiarity is, that sometimes water solubility may be obscured. For instance, tests have been indicated previously which are employed to show when the reaction with pyridine has gone to completion. On completion, the structure of the resultant may be so resinous and so tacky, that it shows a very slow rate of solubility in water. Thus, a test may, at first sight, indicate the product is still water-insoluble, whereas, it is actually water-soluble, or at least, self-emulsifiable. To guard against such possible error, it is well to take a small amount of the reaction mass and reflux it with an excess of water, or better still, dissolve the reaction mass by warming in methyl alcohol and then dilute with an excess of water.

This same feature merits consideration in the manufacture of the foregoing demulsifiers. If the demulsifying mixture, as exemplified by Examples 1, 2, and 3, preceding, does not form a homogeneous mixture in combination with the indicated solvents, then methyl alcohol should be added until a homogeneous mixture is obtained. Sometimes a mixture of 50% water and 50% methyl alcohol is even better. The basic principle involved is that these products are polar or ionic and their solution is accelerated by the presence of a polar solvent.

Oddly enough, however, in light of the enormous hydrophobe radical present in their structure, their solution may also be accelerated by a comparatively non-polar solvent, such as kerosene, or a semi-polar solvent, such as cresylic acid.

Polar solvents yield both dilute and concentrated solutions, sols, or homogeneous mixtures, whereas, non-polar and semi-polar solvents may only yield comparatively concentrated solutions or sols in some instances.

Attention is directed to our co-pending applications for patent Serial Nos. 630,973, 630,974, 630,977 and 630,978 filed November 26, 1945.

Having thus described our invention, what we claim as new and desire to secure by Letters Patent is:

1. A process for breaking petroleum emulsions of the water-in-oil type, characterized by subjecting the emulsion to the action of a demulsifier comprising a hydrophile compound of the formula:

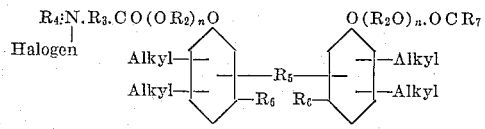

in which $R_2O$ is an alkylene oxide radical containing at least 2 and not more than 4 carbon atoms selected from the class consisting of ethylene oxide, propylene oxide, butylene oxide, glycide and methylglycide radicals; $n$ is a small whole number varying from 1 to 3; $R_3.CO$ is the acyl radical of a low molal monocarboxy acid having not more than 6 carbon atoms, in which an alpha-hydrogen atom has been removed, $N:R_4$ represents a radical of a heterocyclic compound of the pyridine series selected from the group consisting of pyridine, quinoline, isoquinoline, and C-linked methyl homologues; $R_5$ is a low molal aldehydic residue having not over 7 carbon atoms selected from the class consisting of methylene and substituted methylene radicals; $R_6$ is a member of the class consisting of hydrogen atoms and alkyl radicals having not over 8 atoms and with the additional proviso that the phenolic residues are substituted monocyclic phenol radicals having 2 of the 3 reactive 2, 4, 6 positions substituted by two alkyl side chains, of which at least one contains 3 carbon atoms and the longest of which does not contain more than 8 carbon atoms; and $(R_2O)_n.OCR_7$ is a radical, in which $R_2O$ and $n$ have their prior significance and $R_7CO$ is the acyl radical of a monocarboxy detergent-forming acid having at least 8 and not more than 32 carbon atoms.

2. The process of claim 1, wherein the halogen is chlorine.

3. The process of claim 1, wherein the halogen is chlorine and $n$ is one.

4. The process of claim 1, wherein the halogen is chlorine, $n$ is one, and the alkylene oxide radical is the ethylene oxide radical.

5. The process of claim 1, wherein the halogen is chlorine, $n$ is one, the alkylene oxide radical is the ethylene oxide radical, and all alkyl radicals are amyl radicals.

MELVIN DE GROOTE.
BERNHARD KEISER.

REFERENCES CITED

The following references are of record in the file of this patent:

UNITED STATES PATENTS

| Number | Name | Date |
|---|---|---|
| 1,990,985 | Fonrobert et al. | Feb. 12, 1935 |
| 2,255,252 | Harris | Sept. 9, 1941 |
| 2,299,756 | Katzman et al. | Oct. 27, 1942 |
| 2,306,775 | Blair | Dec. 29, 1942 |
| 2,331,265 | Coleman et al. | Oct. 5, 1943 |
| 2,372,257 | De Groote et al. | Mar. 27, 1945 |
| 2,385,970 | De Groote et al. | Oct. 2, 1945 |